United States Patent
Caballero Jambrina

(10) Patent No.: US 12,418,344 B2
(45) Date of Patent: Sep. 16, 2025

(54) TRAFFIC-BASED POWER SAVING MODE FOR OPTICAL TRANSCEIVERS

(71) Applicant: Cisco Technology, Inc., San Jose, CA (US)

(72) Inventor: Antonio Caballero Jambrina, Arlington, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/872,617

(22) Filed: Jul. 25, 2022

(65) Prior Publication Data

US 2024/0031029 A1 Jan. 25, 2024

(51) Int. Cl.
*H04B 10/40* (2013.01)

(52) U.S. Cl.
CPC ................................ *H04B 10/40* (2013.01)

(58) Field of Classification Search
None
See application file for complete search history.

(56) References Cited

U.S. PATENT DOCUMENTS

| | | | | |
|---|---|---|---|---|
| 8,255,582 B2 * | 8/2012 | Wong | ............. | H04B 10/40 |
| | | | | 710/14 |
| 8,526,823 B2 * | 9/2013 | Swanson | ............. | H04B 10/0795 |
| | | | | 398/208 |
| 8,565,601 B2 * | 10/2013 | Nakura | ............. | H04B 10/272 |
| | | | | 398/140 |
| 8,712,236 B2 * | 4/2014 | Giessler | ............. | H04B 10/524 |
| | | | | 398/189 |
| 9,236,948 B2 * | 1/2016 | Giessler | ............. | H04B 10/40 |
| 9,240,854 B2 * | 1/2016 | Mukai | ............. | H04J 14/0267 |
| 9,270,406 B2 * | 2/2016 | Hirano | ............. | H04Q 11/0067 |
| 9,356,699 B2 * | 5/2016 | Diab | ............. | H04L 12/12 |
| 9,432,114 B2 * | 8/2016 | Shaffer | ............. | H04B 10/27 |
| 10,389,472 B2 * | 8/2019 | Luo | ............. | H04B 10/27 |
| 10,425,161 B2 * | 9/2019 | Groepl | ............. | G06F 13/385 |
| 10,432,340 B2 * | 10/2019 | Yang | ............. | H04J 14/0257 |
| 2012/0177361 A1 * | 7/2012 | Hirano | ............. | H04J 14/0247 |
| | | | | 398/1 |

(Continued)

OTHER PUBLICATIONS

Siepon_C10_D1_4; siepon_C10_D1_4", IEEE Draft; SIEPON_C10_D1_4, IEEE-SA, Piscataway, NJ USA, vol. 802.1, No. D1_4, Jul. 8, 2011 (Jul. 8, 2011), pp. 1-46; XP017739995, [retrieved on 2-11-07-08].

(Continued)

*Primary Examiner* — Jai M Lee
(74) *Attorney, Agent, or Firm* — Patterson + Sheridan, LLP

(57) ABSTRACT

In part, the disclosure relates to a method for power saving in optical transceivers during idle activity. The method may include receiving, by a first receiver a request to initiate idle mode; identifying, based on the request to initiate the idle mode, a frequency of ping times during the idle mode; initiating the idle mode and deactivating one or more functions of the digital signal processor; receiving, by the first receiver, from the first transmitter, a plurality of ping signals on a plurality of respective ping times; and terminating, responsive to a ping signal comprising a request to end idle mode, the idle mode by activating the one or more functions of the digital signal processor.

11 Claims, 2 Drawing Sheets

(56) References Cited

U.S. PATENT DOCUMENTS

2014/0079396 A1* 3/2014 Hirano ................. H04B 10/272
398/67
2024/0031029 A1* 1/2024 Caballero Jambrina ....................
H04B 10/60

OTHER PUBLICATIONS

Extended European Search Report for European Application No. 23186862.1, dated Dec. 6, 2023, (9 pages).

* cited by examiner

TRAFFIC-BASED POWER SAVING MODE FOR OPTICAL TRANSCEIVERS

FIELD

This disclosure relates generally to the field of telecommunications and photonics.

BACKGROUND

Contemporary optical communications and other photonic systems make extensive use of photonic integrated circuits that are advantageously mass-produced in various configurations for various purposes.

SUMMARY

In part, the disclosure relates to a method for power saving in optical transceivers during idle activity. The method may include receiving, by a first receiver a request to initiate idle mode; identifying, based on the request to initiate the idle mode, a frequency of ping times during the idle mode; initiating the idle mode and deactivating one or more functions of the digital signal processor; receiving, by the first receiver, from the first transmitter, a plurality of ping signals on a plurality of respective ping times; and terminating, responsive to a ping signal comprising a request to end idle mode, the idle mode by activating the one or more functions of the digital signal processor.

In some embodiments, idle mode is low-power mode configured to reduce power consumption. In various embodiments, the request is encoded as a field of a data packet. In some embodiments, the field is encoded in a proprietary header of the data packet. The method may further include decoding, using the first receiver, a header of a received packet and checking to see if the first transmitter is requesting an end to the low-power mode. In some embodiments, the first receiver is a first transceiver and wherein the first transmitter is a second transceiver. The method may further include suspending or reducing power requirements of one or more of a chromatic dispersion, an equalizer function, or a forward error correction function of a DSP in response to entering low-power mode.

In some embodiments, the first transceiver transmits a confirmation to the second transceiver that low-power mode is inactive and normal operation has resumed. In some embodiments, the receiver captures a state of the DSP to adjust time to awake and recovery time. In many embodiments, the method may further include maintaining a substantially constant transmitter amplitude and bandwidth.

In part, the disclosure relates to a method for power saving in optical transceivers during idle activity. The method may include transmitting, from a first transceiver to one or more second transceivers, a request to initiate idle mode, wherein the request to initiate idle mode causes each second transceiver to deactivate one or more functions of a digital signal processor associated with the second transceiver; causing, during transmission of periodic signals from the first transceiver to the second transceivers, the second transceivers to forego processing of a non-header portion of the periodic signals; and transmitting, by the first transceiver to the subset of the second transceivers, a request to end idle mode, wherein the request to end idle mode causes the subset of the second transceivers to activate one or more functions of digital signal processor associated with the second transceiver. In some embodiments, the first transceiver is on a client side and further comprising grouping one or more ports on the client side together to be multiplexed directly to a second transceiver in low-power mode. In various embodiments, the method may include maintaining a substantially constant transmitter amplitude and bandwidth for the first transceivers. In some embodiments, the first transceiver is a transmitter. In some embodiments, the one or more second transceivers are transmitters.

In part, the disclosure relates to a system for power saving in optical transceivers. The system may include a plurality of receiver devices, wherein each receiver device comprises: a receiver processor; a receiver memory; and an idle mode module configured to deactivate a non-idle mode module and intermittently process a header of a periodic signal received from a transmitting device optically linked to the receiver device; the non-idle mode module configured to deactivate the idle mode module and routinely process the header and a payload of the periodic signal received from the transmitting device optically linked to the receiver device.

In some embodiments, the system may further include a plurality of transmitting devices, wherein each transmitting device comprises: a transmitter processor, a transmitter memory, and a mapping module configured to update optical links between the transmitting device and one or more of the plurality of receiver devices via a multiplexer. In some embodiments, the mapping module is configured to group a plurality of inactive ports and map them to a receiver device in idle mode. In various embodiments, the receiver device comprises a DSP, wherein low-power mode is configured to suspend or terminate one or more functions of the DSP. In some embodiments, the one or more functions are selected from the group consisting of a chromatic dispersion function, an equalizer function, or a forward error correction function.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, coatings/layers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
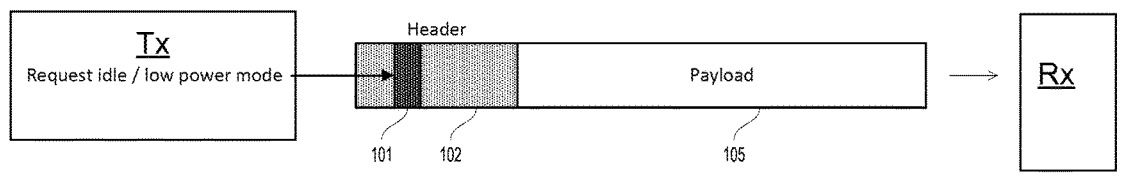
FIG. 1 is diagram of a packet with an idle request in a header as a protocol implementation for entering a low power mode according to an exemplary embodiment of the disclosure.

In an optical transceiver, at least 50% of the power dissipation may be attributable to chromatic dispersion and digital signal processing (DSP) on the receiver side, including equalizer and forward error correction functions. Even when no traffic is sent through an optical communications link, channel stability constraints usually require that dummy data be sent, and receiver DSP usually operates at full capacity.

In part, the disclosure relates to a system for achieving power saving in optical transceivers, receivers, transmitters, and other communications devices during periods of low traffic or no traffic. In various embodiments, low traffic or no traffic may refer to when there is actual data is sent though the link that includes dummy data. In various embodiments, the line side operates at the same rate, while the client side is receiving the actual data or no data.

Even when traffic is low enough that a subset of available communications channels are not required for a substantial period of time, optical communications systems generally have a stability requirement that prevents otherwise unused channels from being powered off. When an optical link is not running at full capacity, some channels may continue to send dummy data, keeping the link active and running transceiver digital signal processing (DSP) modules at full power. In part, in some embodiments, the disclosure relates to a protocol for enabling a low-power mode in an optical communications link when no real traffic is sent through the link. In some embodiment, system generated data for operational use, dummy data or similar data does not constitute real or production data. In part, the disclosure also relates to a method of resuming from the low-power mode to full power mode or normal operating mode. In another aspect, the disclosure relates to a client- to line-side mapping processing, wherein traffic-generating ports in a client device may be mapped to available transmission channels and non-generating client device ports may be mapped to transmission channels which are in the low-power mode. In various embodiments, the mapping approach help increase the time that channels may remain in the low-power mode. Many embodiments of the current disclosure describe an optical communications system including a receiver and a transmitter that may transition to a low-power mode in response to a decrease in the traffic being handled by the system or a component thereof. Some embodiments describe methods or protocols implemented using a processor, an ASIC, or the transmitter and receiver to transition the system to a low-power mode while maintaining shared channels of a link from being affected. In some embodiments, shared channels of a link refer to maintaining the transmission medium unaffected by not varying the optical power, power density nor wavelength of the channel that transition to low power. In various embodiments, that transition does not affect the physical properties of the transmission media, such as an optical fiber.

Various embodiments of the current disclosure also describe methods of transitioning into a low-power mode when a communications link is unidirectional from a transmitter to a receiver. In addition, some embodiments relate to a client-side to line-side mapping process that matches groups of client-side communication ports with particular transmitters on the line side to further increase power savings.

Refer now to the exemplary embodiment of FIG. 1. To transition the system into a low-power mode, the transmitter (Tx) sends a request to the receiver (Rx) to initiate the transition to low-power mode. In some embodiments, the request is encoded in a field 101 in a header 102 of a data packet sent to the receiver. The header is transmitted with a payload of data 105 in various embodiments as shown. This field 101 requests the low power mode and establishes the duration of the idling time and ping time in some embodiments. In some embodiments, the field may be before or after the payload 105.

In many embodiments, a low-power mode includes a ping time and an idling time. These times may be defined by the field 101 in the header or a combination of fields. In some embodiments, the ping and idling times may be user specified or otherwise agreed upon. A ping time is a short time during which the receiver is partially powered on to check if an end to the low-power mode is signaled by the transmitter. An idle time is the time between ping times. The low-power mode request sent by the transmitter to the receiver may also establish the ping time and the idling time. In some embodiments, it is not a requirement that the request also sends the ping time and idling, for example if previously agreed upon.

In most embodiments, after the receiver receives a request to transition to a low-power mode, the receiver will shut down non-essential processes, including demodulation processes for incoming signals, decreasing energy consumption of the receiver. After receiving a request for a low-power mode, the receiver also stores its current state in a receiver memory so that the receiver may quickly resume from the low-power mode.

In various embodiments, the power reduction of the transmitter/receiver system when the system is in a low-power mode is due to a power reduction on the receiver side. The receiver powers off several DSP blocks when in a low-power mode. In some embodiments, the analog-to-digital (ADC) signal capture in the receiver remains on in order to guarantee fast recovery, but other receiver blocks, such as equalization blocks, chromatic dispersion compensation (CDC) blocks, carrier phase recovery (CPR) blocks, and forward error correction (FEC) decoder blocks may be powered off. In some embodiments, a majority of the reduction in power when the receiver is in a low-power mode is due to the powering down of CDC and FEC blocks.

In certain embodiments, a complex m-dimensional quadrature amplitude modulation (m-QAM) normally used when the transmitter operates at full capacity, e.g. 16QAM with 4 levels, or e.g. 64QAM with 6 levels, may be converted to a 4-QAM with 2 levels when the transmitter operates in a low-power mode. If the effective power is the same and the baud rate is unchanged, the transmitter will not affect other signals in the channel. In some embodiments, the power and baud rate (and thus power density) are managed to maintain the same transmission properties of the fiber, so other channels are not affected by the low power mode. In some embodiments, the transmitter (Tx) side can also transition to a low power mode subject to constraining the transmitter amplitude and bandwidth to be substantially the same. In some embodiments, the header structure may also be kept unchanged. In various other embodiments, the header structure may be changed to a low power header mode. In some embodiments, the transmitter (Tx) side can transition to a low power mode without the foregoing restrictions.

In some embodiments, after a request to enter a low-power mode is sent to the receiver, the transmitter may also enter a low-power mode, disabling non-essential processes and reducing energy consumption. In a low-power mode, the transmitter still maintains the same amplitude, bandwidth, and header structure as when the transmitter is operating at full capacity. Energy consumption from one or more of the DSP operation and one or more ASIC operations such as an equalizer function and forward error correction functions may all be reduced by entering low-power mode as disclosed herein. In some embodiments, the disclosure relates to a protocol implementation method and/or a processor or ASIC-based module configured to enable a low-power mode when the link is unidirectional. A link may be unidirectional when a receiver cannot communicate its state to the transmitter to confirm the low-power mode state. When the link is unidirectional, a bi-directional implementation may become trivial. This follows if a receiver sends an acknowledgement of low power to a transmitter indicating receipt by the receiver, no guessing is needed and a request and accept protocol may be used. A given protocol, ASIC, or processor implementation may be used to support client to line side mapping to imitate and increase the duration of low power mode by selectively routing traffic away from idle components.

Figure 2:
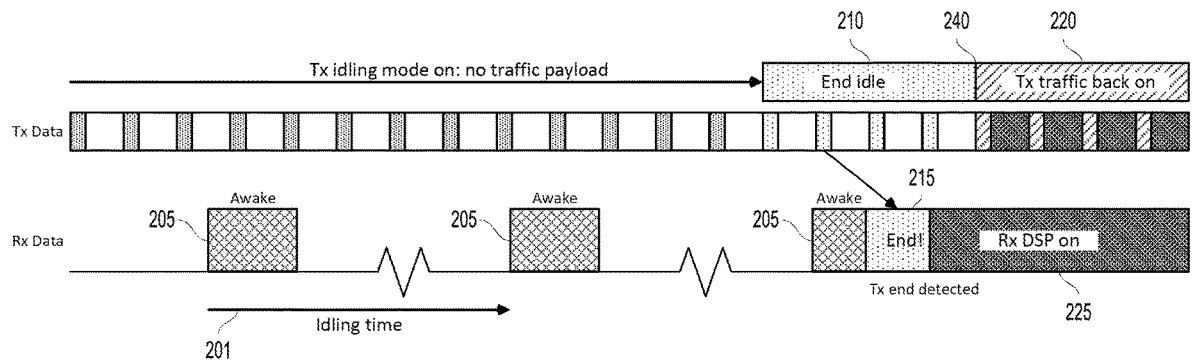
FIG. 2 is a timing diagram of network traffic as seen in a transmitter and in a receiver both during idling time and as idling time ends, according to an exemplary embodiment of the disclosure.

Refer now to the exemplary embodiment of FIG. 2. When the receiver (Rx) is in a low-power mode, the transmitter (Tx) sends a series of ping or 'awake' signals 205 to the receiver. In most embodiments, the ping signals are separated by an idling time 201. At every ping or awake signal, the transmitter has the opportunity to request termination of the low-power mode. At every ping or awake signal, the receiver decodes a header of a received packet, checking to see if the transmitter is requesting an end 210 to the low-power mode/end idle. In many embodiments, if the receiver detects a request 215 to end the low-power mode/end idle, the receiver will reload its saved state from receiver memory, return to full power, reestablish DSP 225, and resume processing incoming traffic. In some embodiments, for stable links, the idling time may be in the seconds regime. In various embodiments, the idling time may range from about 0.5 seconds to about 800 seconds. In various embodiments, the ping signal may be in the millisecond time regions. In some embodiments, the duration of a ping signal may range from about 1 to about 500 milliseconds, the average power consumption when the system is in the low-power mode is approximately equal to the power consumption during the idling time. In some embodiments, there is only about a 0.1% increase in power dissipation from a pure low power mode implementation.

In various embodiments, at some point 240 in time after the transmitter has sent a request 215 to end the low-power mode to the receiver, the transmitter assumes that the receiver has had enough time to decode the request and return to full capacity. After this point 240, the transmitter also returns 220 to full capacity, non-idle/non-low power mode. In various embodiments, end idle or request idle correspondence to ending low-power mode or requesting it.

In some embodiments, transceivers with bidirectional capabilities such as, for example, transceivers in which the receiver may communicate to the transmitter via a secondary channel may be used with the systems and methods disclosed herein. In some embodiments, a bidirectional transceiver may generate one or more additional confirmations to the transmitter that the receiver/transceiver has exited the low-power mode and returned to full capacity mode.

Figure 3:
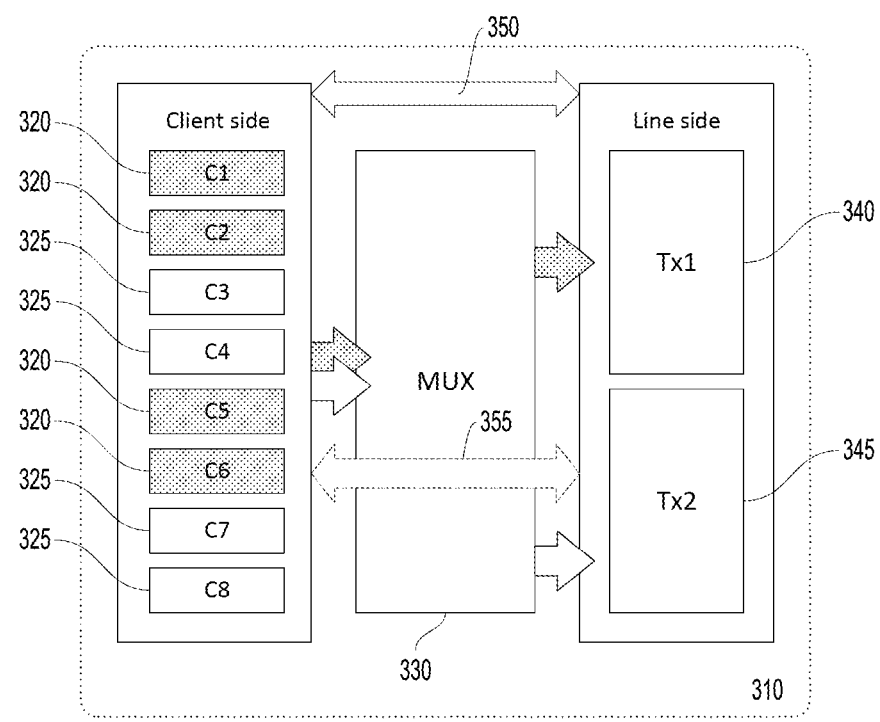
FIG. 3 is a diagram of client side to line side mapping method suitable for maintaining low power modes or increasing their duration by directing idle traffic channels thereto according to an exemplary embodiment of the disclosure.

Refer to the exemplary embodiments of FIG. 3. In most embodiments, in a client side to line side transceiver 310, also referred to as a client-line transceiver, where multiple traffic-generating client-side ports 320, 325 are multiplexed 330 to line-side transmitters 340, 345 additional power savings in a low-power mode may be realized by grouping idling client-side ports 325 to a group of line side transceivers 340. For example, in the embodiment of FIG. 3, containing 8 client ports C1, C2, . . . , C8 (320, 325) multiplexed to two line-side transmitters 340, 345, half of the client ports 325 are idle. For example, C3, C4, C7, and C8 are idle. These client ports 325 are multiplexed to a particular transmitter (Tx2) 345, while non-idle ports 320 are multiplexed to another transmitter (Tx1) 340. In this configuration, the transmitter (Tx1) 345 paired with the idling ports 325 can initiate a low-power mode with its receiver. This low-power made can be maintained for a longer period of time as a result of the mapping of low traffic/no traffic ports to a transmitter 435 which can be set in a low-power/idle mode. In various embodiments, one or more communication channels such as bi-directional communication channel 350 is configured to transfer the idling state from the client side to line and vice versa. In various embodiments, the one or more communication channels such as bi-directional communication channel 355 is in communication with one or both sides of the multiplexer to transfer information about idle states on the line side and/or the client side. Bi-directional communication channels 350, 355 may be in electrical communication with memory, ASICs, controllers, processors, and other components on either or both of the client and line side. In some embodiments, bi-directional communication channels 350, 355 may be replaced with a unidirectional channel or two unidirectional channels operating in opposing transmission directions. In various embodiments, idle ports on the client side may be matched with one transmitter 345 so that transmitter 345 can remain in a low power mode for an extended time period and increase power savings.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP) or another ASIC or processor responsive to the protocol, mappings and low-power mode transitioning and maintaining various links in low-power mode by managing idle source of data to map to them. In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments and protocols disclosed herein stored on a computer readable medium may be loaded into a processor and executed.

In various embodiments, the low power mode features and other features disclosed herein may be used for other transmission links where the transmission media should be kept constant. For example, wireless links that should keep transmitting due to licensing usability, wireless jamming (broad spectrum with overlapping channels), secure links and other use cases. With regard to secure links, (for example in cryptography, an intruder could see that saving power if medium changes, with some of the methods disclosed herein, the intruder will not see a change while the transceivers transition to low power mode.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method for power saving in optical transceivers during idle activity, the method comprising:
   receiving, by a first receiver a request to initiate low-power mode;
   initiating the low-power mode and deactivating one or more functions of a digital signal processor, wherein the low-power mode comprises a ping time and an idle time,
   wherein the idle time is a time between ping times;
   receiving, by the first receiver, from a first transmitter, a plurality of ping signals on a plurality of respective ping times;
   increase duration of the low-power mode by mapping traffic generating ports in a client device may to available transmission channels and mapping non-generating client device ports to transmission channels which are in the low-power mode; and
   terminating, responsive to a ping signal comprising a request to end low-power mode, the low-power mode by activating the one or more functions of the digital signal processor.

2. The method of claim 1, wherein the request to initiate the low-power mode is encoded as a field of a data packet that is sent from a transmitter.

3. The method of claim 2, wherein the field is encoded in a proprietary header of the data packet.

4. The method of claim 1 further comprising decoding, using the first receiver, a header of a received packet and checking to see if the first transmitter is requesting an end to the low-power mode.

5. The method of claim 1, wherein the one or more functions is two functions, wherein the two functions are selected from the group consisting of a chromatic dispersion compensation function, an equalizer function, a carrier phase recovery function, and a forward error correction function.

6. The method of claim 5, wherein the first transmits a confirmation to the first transmitter that the low-power mode is inactive and normal operation has resumed.

7. The method of claim 5, wherein the ping time is a time during which the first receiver is partially powered on to check if an end to the low-power mode is signaled by the first transmitter.

8. The method of claim 5 further comprising storing a current state of the first receiver in a receiver memory in response to receiving the request for the low-power mode.

9. The method of claim 1 further comprising suspending or reducing power requirements of one or more of a chromatic dispersion, an equalizer function, or a forward error correction function of a DSP in response to entering the low-power mode.

10. The method of claim 1, wherein the ping time is a time during which the first receiver is partially powered on to check if an end to the low-power mode is signaled by the first transmitter.

11. The method of claim 1 further comprising maintaining an approximately constant transmitter amplitude and bandwidth.

* * * * *